United States Patent [19]

Dakin

[11] Patent Number: 4,623,953
[45] Date of Patent: Nov. 18, 1986

[54] DIELECTRIC FLUID, CAPACITOR, AND TRANSFORMER

[75] Inventor: Thomas W. Dakin, Boca Raton, Fla.

[73] Assignee: Westinghouse Electric Corp., Pittsburgh, Pa.

[21] Appl. No.: 729,371

[22] Filed: May 1, 1985

[51] Int. Cl.$^4$ .................... H01B 3/24; C10M 101/02
[52] U.S. Cl. ................ 361/315; 174/17 LF; 252/407; 252/570; 252/578; 336/94; 361/319; 526/346; 585/6.3; 585/6.6
[58] Field of Search .............. 252/570, 578, 407; 585/6.3, 6.6; 336/94; 361/315, 319; 174/17 LF; 526/346

[56] References Cited

U.S. PATENT DOCUMENTS

| | | | |
|---|---|---|---|
| 2,112,735 | 3/1938 | Clark | 585/6.6 |
| 2,176,952 | 10/1939 | Berberich | 252/1 |
| 2,283,236 | 5/1942 | Soday | 526/346 |
| 2,508,099 | 5/1950 | Clark | 585/6.3 |
| 2,719,182 | 9/1955 | Ross et al. | 361/315 |
| 3,549,537 | 12/1970 | Brewster et al. | 585/6.6 |
| 4,054,937 | 10/1977 | Mandelcorn et al. | 361/319 |
| 4,442,027 | 4/1984 | Sato et al. | 252/574 |
| 4,506,107 | 3/1985 | Sato et al. | 252/570 |
| 4,540,738 | 9/1985 | Zimmermann | 524/124 |
| 4,543,207 | 9/1985 | Sato et al. | 252/570 |
| 4,549,034 | 10/1985 | Sato et al. | 252/570 |

OTHER PUBLICATIONS

Caldwell et al., "The Reactivity of Phenols Toward Peroxy Radicals, I. Inhibition of the Oxidation and Polymerization of Methyl Methacrylate by Phenols in the Presence of Air," J. Am. Chem. Soc., vol. 84, No. 13, p. 2878 (1962).

*Primary Examiner*—Paul Lieberman
*Assistant Examiner*—Robert A. Wax
*Attorney, Agent, or Firm*—R. D. Fuerle

[57] ABSTRACT

Disclosed is a dielectric fluid which comprises about 5 to about 40 molar percent of a first arene compound having up to seven substituent alkenyl carbon atoms and about 60 to about 95 molar percent of a diluent. The diluent can be mineral oil, a second arene compound having up to seven substituent alkyl carbon atoms which are hydrocarbons, hydrocarbon ethers, or a mixture thereof, or a mixture of a mineral oil and a second arene compound. Also preferably included in the dielectric fluid is about 0.5 to about 5% of a free-radical polymerization inhibitor. A capacitor and a transformer containing the dielectric fluid are also disclosed.

13 Claims, 3 Drawing Figures

DIELECTRIC FLUID, CAPACITOR, AND TRANSFORMER

BACKGROUND OF THE INVENTION

Until a few years ago, polychlorinated biphenyls (PCB's) were widely used as dielectric fluids in transformers and capacitors. However, when it was discovered that PCB's persisted in the environment and had deleterious effects on wildlife and possibly people, government regulations began to prohibit their use. As PCB's were phased out, it was necessary to find other dielectric fluids of comparable electrical, chemical, and physical properties.

One of the most important electrical properties for a dielectric fluid is a high dielectric strength, particularly a high partial discharge onset and offset voltage. While many of the fluids that were substituted for PCB's were comparable in other properties, in these two properties they were often deficient.

SUMMARY OF THE INVENTION

We have discovered a dielectric fluid which has great resistance to partial discharges and has greater dielectric strength than prior fluids, particularly in non-uniform electrical fields such as occur around points and edges. The fluids of this invention tend to evolve less hydrogen under discharge, and the discharge pulse size is smaller.

RELEVANT ART

U.S. Pat. No. 2,176,952 discloses a dielectric fluid which includes a combination of mineral oil and a compound such as diphenyl oxide.

U.S. Pat. No. 4,054,937 discloses a capacitor containing a dielectric fluid of a mixture of monoalkylated, and di-alkylated aromatic compounds.

DESCRIPTION OF THE INVENTION

Figure 1:
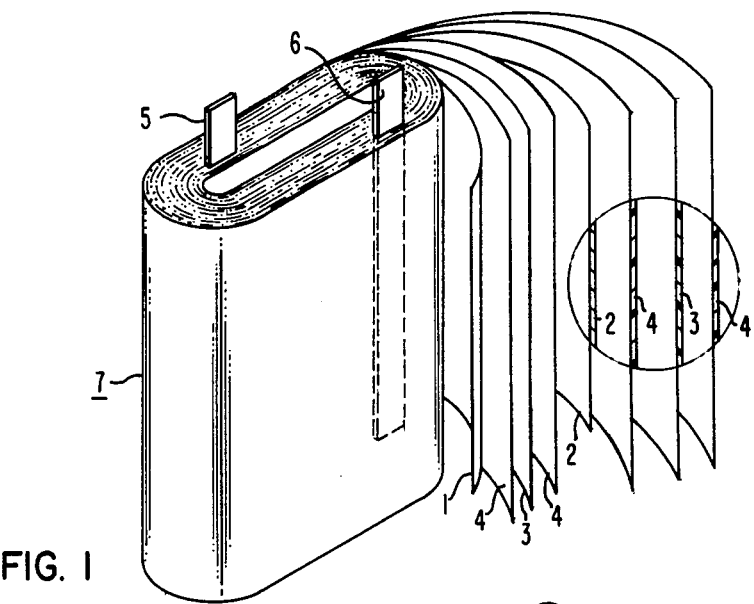
FIG. 1 is an isometric view with an enlargement window illustrating the construction of a film-paper-film capacitor winding.

In FIG. 1, two layers of metal foil 1 and 2 are wound with layers of paper 3 and layers of insulating film 4. The insulating film is preferably polypropylene because it permits a capacitor to operate at a high KVAR (kilovolt amperes reactive) per unit volume due to its high electric strength and low dissipation factor. Also, it is not degraded by the dielectric fluids of this invention even under extreme operating conditions. Other insulating films such as high density polyethylene could also be used. Leads 5 and 6 are connected to foils 1 and 2, respectively. The capacitor winding 7 is placed in a can and is impregnated with a dielectric fluid according to this invention.

Figure 2:
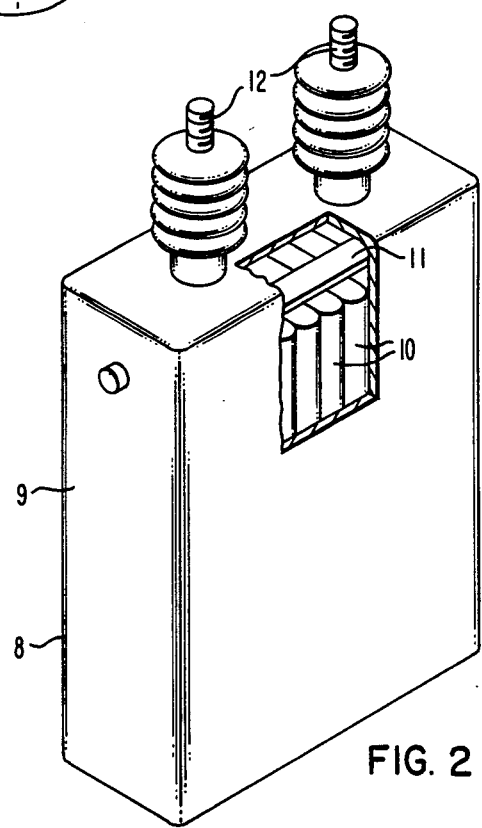
FIG. 2 is an isometric view partially cut away showing a certain presently preferred embodiment of a capacitor in accordance with the invention.

In FIG. 2, a capacitor unit 8 having a unitary housing 9 that encloses a plurality of wound capacitor sections 10 that are stacked on end in the housing. Each capacitor section 10 comprises electrode foil material and a dielectric material which consists entirely a plastic film such as polypropylene. Each section 10 is wound with dielectric material on each side of the two electrodes in a convolute winding. The unit is impregnated with a liquid dielectric fluid according to this invention. The plurality of capacitor sections are mutually interconnected by metal areas 11 deposited on the ends of the sections and contacting extended foil material that extends from the sections outside the zone in which the dielectric film is located. The plurality of interconnected sections are connected to terminals 12 extending from housing 9 by wire conductors at selected locations.

Figure 3:
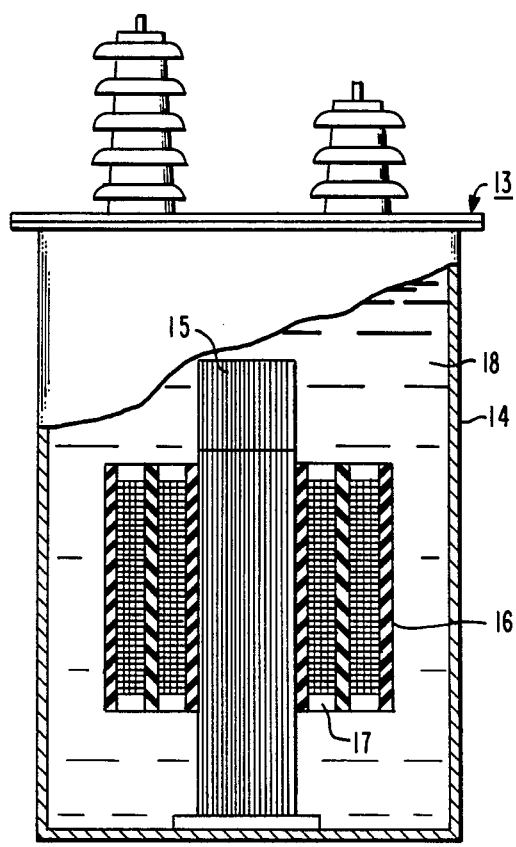
FIG. 3 is a side view in section of a certain presently preferred embodiment of a transformer containing a dielectric fluid stabilized according to this invention.

In FIG. 3, a transformer 13 is shown as comprising a sealed tank 14, a ferrous metal core 15 a primary coil 16, a secondary coil 17, and a dielectric fluid 6 which surrounds and covers the core and coils.

The organic dielectric fluid of this invention is a mixture of the principal insulating fluid such as oil or a propyl biphenyl with an arene compound, plus a polymerization inhibitor. The arene compound is a compound having at least one aromatic group and vinyl or ethylenic unsaturation, and contains only hydrogen, carbon, and possibly ether-oxygen atoms. Thus, the compound could be a vinyl aromatic hydrocarbon (such as styrene), a vinyl aromatic ether hydrocarbon, an ethylenic aromatic hydrocarbon, or an ethylenic aromatic ether hydrocarbon. The total number of non-ethylene and non-aromatic carbon atoms in the arene compound should be less than seven because compounds with more non-ethylenic non-aromatic carbon atoms tend to produce too much hydrogen in an electrical discharge. A certain presently preferred general formula for the arene compound is

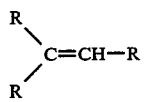

where each R group is independently selected from hydrogen, hydrocarbon, and ether hydrocarbon, and at least one of the R groups is aromatic. Vinylic unsaturation is preferred to ethylenic unsaturation because vinylic unsaturation is more reactive with hydrogen. Preferred vinylically unsaturated aromatic compounds include vinyl xylene, vinyl toluene, and vinyl isopropyl biphenyl, because these compounds have high aromaticity. Other vinyl arene compounds which could be used include vinyl methyl diphenyl, vinyl dimethyl diphenyl, vinyl ethyl diphenyl, vinyl phenyl tolyl ether, and vinyl phenyl xylyl ether. Ethylenically unsaturated arene compounds which are preferred because of their high aromaticity are di-tolyl ethene and isopropyl diphenyl ethene. Xylyltolyl ethene can also be used.

The principal insulating fluid component can be either mineral oil or an aromatic hydrocarbon or an aromatic ether which can have saturated aliphatic substituents of 1 to 3 carbons. Aromatic hydrocarbons or ethers are preferred to mineral oil. The preferred mineral oil is transformer oil as it is better suited for electrical applications. The aromatic hydrocarbon or ether is a compound which contains at least one aromatic group and which consists of only hydrogen, carbon, and possibly ether oxygen atoms. The aromatic hydrocarbon or ether should also have less than seven non-aromatic carbon atoms as more non-aromatic carbon atoms tend to result in the production of too much hydrogen in an electrical discharge. Examples of suitable aromatic hydrocarbons or ethers include isopropyl biphenyl, diphenyl oxide, diphenyl, diphenyl methane, diphenyl ethane, benzyl phenyl ether, isopropyl diphenyl ether, xylyltolyl diphenyl ether, di-tolyl diphenyl ether, and ethyl methyl diphenyl ether. Compounds which contain aliphatic ether linkages ($-CH_2-O-CH_2-$), such as dibenzyl ether, although suitable electrically, should be avoided as they tend to be chemically unstable. The preferred aromatic hydrocarbon or ether is isopropyl biphenyl because it is important commercially.

The arene compound and the diluent are selected so that the dielectric fluid has a boiling point greater than 150° C., a freezing point less than −40° C., and a dielectric constant of less than 3.5. That is, either the arene compound or the diluent by itself may exceed these limits, but the mixture as a whole must fall within the limits to be useful as a dielectric fluid.

To prevent polymerization of the arene compound, it is preferable to also include a free-radical polymerization inhibitor in the dielectric fluid. Suitable polymerization inhibitors include t-butyl pyrocatechol and pyrocatechol.

The dielectric fluid of this invention is a mixture of about 5 to about 40 molar percent of the arene compound, about 60 to about 95 molar percent of the diluent, and about 0.5 to about 5 molar percent of the polymerization inhibitor. If less of the arene compound is used, there is little enhancement of the electrical properties of the diluent, and if more than 40 molar percent of the arene compound is used, it may tend to polymerize.

The dielectric fluid of this invention can be used in capacitors, transformers, cables, and other electrical equipment. However, it may not be suitable for use in circuit breakers because it may have a tendency to carbonize in an electric arc.

The following example further illustrates this invention.

EXAMPLE

Partial discharge tests were performed with a vacuum impregnated 0.030″ pressboard (cellulose) barrier between a needle and a large sphere electrode in the liquid.

| Liquid | Test # | Steady Discharge Onset Voltage (KV) | Discharge Level (Picocoulombs) | Discharge Offset Voltage (KV) |
|---|---|---|---|---|
| Isopropyl Biphenyl | 1 | 25.5 | >5000 | 13 |
| | 1 repeat | 20 | " | 13 |
| Isopropyl Biphenyl | 2 | 30 | >5000 | 19 |
| Isopropyl Bisphenyl | 3 | 31 | >5000 | 27 |
| 95% Isopropyl Biphenyl +5% Styrene | 1 | 36 | 4000–5000 | 30 |
| | 1 repeat | 38 | 400–700 | |
| 95% Isopropyl Biphenyl +5% Styrene | 2 | 40 | | |
| 75% Isopropyl Biphenyl +25% Styrene | 1 | 30.5 | 3000 | 26.4 |
| | 1 repeat | 39 | 3000–4000 | 20 |

The above-described experiments showed that the addition of 5% and 25% of a vinyl substituted aromatic (styrene) significantly increased the discharge onset and offset voltage discharge pulse size of isopropyl biphenyl liquid. Styrene itself may be too low a boiling liquid for some processing conditions or applications. A higher boiling vinyl compound would be preferred.

What is claimed is:

1. A dielectric fluid consisting essentially of:
   (A) about 5 to about 40 molar percent of a vinyl compound selected from the group consisting of vinyl xylene, vinyl toluene, vinyl isopropyl biphenyl, and mixtures thereof;
   (B) about 60 to about 95 molar percent of a diluent selected from the group consisting of
      (1) mineral oil;
      (2) an arene compound having up to six substituent alkyl carbon atoms selected from the group consisting of hydrocarbons, hydrocarbon ethers, and mixtures thereof; and
      (3) mixtures thereof, where no substituent chain exceeds 3 carbon atoms in length; and
   (C) about 0.5 to about 5% of a free-radical polymerization inhibitor, said vinyl compound and said diluent being selected so that said dielectric fluid has a boiling point greater than 150° C., a freezing point less than −40° C., and a dielectric constant less than 3.5.

2. A dielectric fluid according to claim 1 wherein said vinyl compound is vinyl xylene.

3. A dielectric fluid according to claim 1 wherein said vinyl compound is vinyl toluene.

4. A dielectric fluid according to claim 1 wherein said vinyl compound is vinyl isopropyl biphenyl.

5. A dielectric fluid according to claim 1 wherein said mineral oil is transformer oil.

6. A dielectric fluid according to claim 1 wherein said diluent is an aromatic compound.

7. A dielectric fluid according to claim 6 wherein said aromatic compound is isopropyl biphenyl.

8. A dielectric fluid according to claim 1 wherein said polymerization inhibitor is selected from the group consisting of pyrocatechol, tert-butyl-pyrocatechol, and mixtures thereof.

9. A capacitor comprising alternating layers of metal foil and solid insulation, impregnated with a dielectric fluid according to claim 1.

10. A transformer comprising a tank containing primary and secondary coils immersed in a dielectric fluid according to claim 1.

11. An improved liquid organic dielectric consisting essentially of
   (A) a vinyl compound selected from the group consisting of vinyl xylene, vinyl toluene, vinyl isopropyl biphenyl, and mixtures thereof;
   (B) a free-radical polymerization inhibitor, and
   (C) a liquid organic dielectric fluid, where said vinyl compound and said liquid organic dielectric fluid are selected so that said liquid organic dielectric has a boiling point greater than 150° C., a freezing point less than −40° C., and a dielectric constant less than 3.5.

12. A dielectric fluid according to claim 11 wherein said liquid organic dielectric fluid is isopropyl biphenyl.

13. A dielectric fluid according to claim 11 wherein said polymerization inhibitor is selected from the group consisting of pyrocatechol, tert-butyl-pyrocatechol, and mixtures thereof.

* * * * *